United States Patent [19]

Imai et al.

[11] Patent Number: 4,476,192

[45] Date of Patent: Oct. 9, 1984

[54] ENAMELED WIRES HAVING RESISTANCE TO OVERLOAD AND PROCESS FOR PRODUCING THE SAME

[75] Inventors: Takeshi Imai; Naohiro Kako; Nobuyuki Asano; Shigeo Masuda; Morihiko Katsuda, all of Aichi, Japan

[73] Assignee: Sumitomo Electric Industries, Ltd., Aichi, Japan

[21] Appl. No.: 401,576

[22] Filed: Jul. 26, 1982

[30] Foreign Application Priority Data

Jul. 24, 1981 [JP] Japan ................................ 56-116648

[51] Int. Cl.$^3$ .......................... B32B 9/00; B05D 5/12; H02G 3/00

[52] U.S. Cl. .................................... 428/391; 428/384; 427/118; 427/120; 427/358; 174/110 S

[58] Field of Search ............... 427/120, 118, 358, 369; 174/110 S, 110 A; 118/125, 405, DIG. 18; 428/378, 384, 391

[56] References Cited

U.S. PATENT DOCUMENTS 3,352,009 11/1967 Cohn et al. ......................... 427/120

4,130,676 12/1978 Ichiyanagi et al. ................. 427/358

4,267,231 5/1981 Zamek ................................ 427/120

*Primary Examiner*—Norman Morgenstern

*Assistant Examiner*—K. E. Jaconetty

*Attorney, Agent, or Firm*—Sughrue, Mion, Zinn, MacPeak & Seas

[57] ABSTRACT

An enameled wire having resistance to overload which comprises an electric conductor and a baked wire enamel coat is disclosed. The wire enamel coat is applied to the conductor through a die from wire enamel comprising a silicone resin having incorporated therein 50 to 200 phr of particles of an inorganic tabular crystalline material that have a maximum average particle size not greater than 80μ, an average not greater than 40μ and an average aspect ratio between 30 and 100 and which react with the silicone resin at elevated temperatures to become a ceramic and which have been surface-treated with a coupling agent, a surface active agent or a coating agent. The tabular crystals in the wire enamel coat are orientated parallel to the surface of the conductor. The enamel coat has good adhesion to the conductor and will not easily crack or peel off the conductor even when subjected to high temperatures and adverse physical stress.

13 Claims, No Drawings

ENAMELED WIRES HAVING RESISTANCE TO OVERLOAD AND PROCESS FOR PRODUCING THE SAME

BACKGROUND OF THE INVENTION

The present invention relates to enameled wires having great resistance to overload and more particularly, to enameled wires that have great resistance to overload and which are not easily shorted even if an overcurrent flows into the motor coils.

Enameled wires used in electric and electronic machines are subject to high temperatures due to the Joule's heat generated by current flow which produces a magnetic field. Accordingly, such wires must be provided with heat resistance that prevents the deformation and thermal deterioration of the wire enamel coating. With the use of various heat-resistant polymeric materials to make the wire enamel coat of electric wires, the size of the machines have been reduced and their reliability has been increased due to fewer shortings. This shows how important it has been to improve the heat resistance of the wire enamel coating of electric wires.

These days, the stationary or mobile coils in electric automotive parts or motors used in especially high-temperature atmospheres as in chemical plants must perform well under hostile conditions such as in high temperature atmospheres, much hotter than conventional ones. More specifically, it is required that no shorting occur between enameled wires and that the coil retain its ability to produce a magnetic field even in hot atmospheres with mechanical vibrations or even if an abnormally great overcurrent flows into the wires.

To meet this requirement, there have been proposed electric wires with a wire enamel coat that becomes ceramic in hot atmospheres. The wires are made of a conductor having a baked layer of a wire enamel comprising a silicone resin and an inorganic material. The silicone resin may be selected from among all types of silicone resin including modified types. Suitable inorganic materials are fine particles of alumina ($Al_2O_3$), barium titanate ($BaTiO_3$), zircon ($ZrSiO_4$), calcium titanate ($CaTiO_3$), lead titanate ($PbTiO_3$), barium zirconate ($BaZrO_4$), steatite ($MgSiO_3$), silica ($SiO_2$), beryllia (BeO), zirconia ($ZrO_2$), magnesia (MgO), clay, kaolin, bentonite, montmorillonite, glass frit, talc, mica, boron nitride, silicon nitride, pyropyllite, aluminum, zinc, nickel, etc.

These wires are made by applying a wire enamel comprising these silicone resins and inorganic materials onto a conductor and baking. These wires can be used equally well as conventional enameled wire under normal conditions and, if the temperature becomes abnormally high, the wire enamel becomes ceramic allowing for normal operation of the machine to continue at high temperatures.

These enameled wires, however, have the following tow defects.

(1) The wire enamel is damaged during coiling operations which subject the wire to mechanical stresses such as elongation, compression, friction and twisting. If damaged, the resulting coil does not have the desired resistance to overload. It is, of course, possible to reduce mechanical damage by using an organic wire enamel that has high flexibility and mechanical strength which has conventionally been employed as a topcoat. However, even with this construction, it is often not possible to prevent significant reduction in the physical properties of the coat after coiling. For instance, a wire that is elongated by 3 to 20% has a resistance to overload about 40 to 70% lower than that of an unextended wire.

(2) A wire enamel that has become ceramic under high temperature atmospheres cracks due to heat cycles accompanying the subsequent cyclic operation of the machine. The cracked enamel will peel off the conductor causing shorting.

SUMMARY OF THE INVENTION

As a result of various studies to solve these problems, the present inventors have accomplished an invention having the following features. First, a wire enamel comprising a silicone resin that is mixed in a specified ratio with a surface-treated inorganic tabular crystalline material that has a specified granularity and aspect ratio and which reacts with the silicone resin at high temperatures to become a ceramic. This material is applied onto a conductor through a die having a special construction. During the application of wire enamel, the inorganic tabular crystalline material is orientated parallel to the surface of the conductor. The coated layer of material is then baked. If necessary, an overcoat may be formed by applying and baking polyimide wire enamel.

The so-prepared enameled wire of the present invention has very good resistance to overload after coiling. Even if the wire enamel coat becomes ceramic at high temperatures and is subjected to heat cycles, cracks do not easily develop in the coat. Accordingly, there is only a small chance that the coating will come off the conductor, and hence, the machine can be operated effectively under elevated temperatures.

DETAILED DESCRIPTION OF THE INVENTION

There is no particular limitation in the kind of silicone resins which can be used in the present invention and various ones can be used; as organic groups which are attached to the silicon element in the siloxane linkage: —Si—O—Si— there can be exemplified various organic groups such as $—CH_3$, $—C_2H_5$, $—CH_2C_6H_5$, $—CH{=}CH_2$, $C_6H_5$, etc. Of these $—C_6H_5$ and $—CH_2C_6H_5$ are preferred from viewpoint of the hardness of the coating layer of a wire enamel comprising the silicone resin matrix containing such group after baking.

If a wire enamel comprising a silicone resin matrix having incorporated therein fine particles of inorganic nontabular crystalline materials such as alumina, silica, silicon nitride, magnesia and titanium dioxide is applied to a conductor and baked, the fine inorganic particles are not orientated in the enamel layer but they are dispersed randomly. Therefore, if the wire is bent, extended or twisted, the wire enamel is very likely to crack. For the past ten-odd years, users of coiled wires have been using automatic winders to streamline the operation and increase productivity. The coiling operation is effected at high speed and under such severe conditions that the wire is subjected to elongation, compression, friction, twisting and other mechanical stresses. As a result, the wire enamel wherein the fine inorganic particles are simply dispersed in the silicone resin without orientation is greatly damaged and the resistance to overload and other characteristics of the wire are significantly impaired. Furthermore, if the wire enamel becomes ceramic under elevated temperatures and it is subjected to heat cycles due to the cyclic operation of the machine, thermal stress unavoidably develops in the wire enamel. The enamel including the fine particles of inorganic nontabular crystalline material is not capable of absorbing the thermal stress and eventually cracks or comes off the conductor.

If wire enamel comprising a silicone resin matrix that has incorporated therein fine particles of inorganic tabular crystalline materials such as mica, talc, bentonite and montmorillonite is applied to a conductor in such a manner that the tabular face of the individual crystals are orientated parallel to the conductor surface and if continuous layers of such enamel are formed, any mechanical stress such as elongation, compression, friction and twisting that occurs during coiling can be absorbed effectively by two adjacent layers of tabular crystals which slip slightly upon application of such stresses. As a result, the enamel coat is resistant to cracking and because its structure becomes somewhat denser, a ceramic that is highly resistant to overload is formed by subsequent exposure to elevated temperatures. As already mentioned, thermal stress develops in the ceramic enamel coat when it is subjected to heat cycles during the subsequent cyclic operation of the machine. However, even such thermal stress can be effectively absorbed by two continuous adjacent layers of tabular crystals that are orientated parallel to the conductor surface and which slip slightly upon appliction of the thermal stress. Because of this feature, the enamel coat does not easily crack or come off the conductor.

In the present invention, the size of tabular crystals is expressed by the average diameter as measured on tabular surfaces, and the longest diameter (length) and the longest of the diameters that cross it at right angles (breadth) are averaged. The granularity of an aggregate of tabular crystals is expressed by the maximum and average of the average diameter of 200 tabular crystals as measured by the enlarged photographic test method according to JIS R6002 (method of testing the granularity of abrasives). Preferred fine particles of inorganic tabular crystalline material have a maximum average diameter of not more than 80μ and an average of not more than 40μ.

Wire enamels comprising the silicone resin and these fine inorganic particles can be applied to the conductor and baked several times depending upon the outside diameter of the conductor and the final thickness of the wire enamel coat. The thickness of the coat formed by each cycle of application and baking is generally not more than 10μ. If a wire enamel containing fine inorganic particles having a maximum average diameter greater than 80μ and an average greater than 40μ is used, the particles do not easily pass through the die in which the enamel is applied. More specifically, only smaller particles can pass through, and some of the particles that have passed through the die protrude from the baked coat and provide an extremely uneven surface.

Tabular crystals are also characterized by the aspect ratio which is the ratio of the average diameter of tabular surfaces to their thickness. The aspect ratio is measured by the following enlarged photographic method with a sample taken according to JIS R6003 (method of sampling abrasives), dried in an air bath at 105±5° C. and cooled to room temperature in a desiccator.

(1) Part of a randomly taken sample is distributed on a slide glass that complies with JIS R3703;

(2) The slide glass is mounted in a magnifier and two particles having a maximum aspect ratio and a minimum ratio are looked for. A picture showing at least 200 particles including these two particles is taken at a magnification of 500 to 800. A picture of an instrument to measure the aspect ratio is also taken at the same magnification;

(3) The aspect ratio of each of the 200 particles including the particles having maximum and minimum aspect ratios is measured accurately on the picture. The same procedure is repeated if the number of particles whose aspect ratio can be measured is less than 200.

The aspect ratios of the 200 particles thus measured are averaged to determine the average aspect ratio of an aggregate of tabular crystals. A large aspect ratio means the crystals are flatter.

It has been experimentally confirmed that fine particles of inorganic tabular crystalline material preferably have an average aspect ratio between 30 and 100. If the average aspect ratio is smaller than 30, the particle becomes correspondingly closer to a cube, and it becomes more difficult to orientate the tabular crystals parallel to the conductor surface by applying the wire enamel to the conductor through a die. If the aspect ratio is larger than 100, it is also difficult to orientate the tabular crystals parallel to the conductor surface because the crystals are so flat that their inherent elasticity causes them to deflect easily.

It has also been confirmed experimentally that the fine particles of inorganic tabular crystalline material are most effectively orientated parallel to the conductor surface when the crystals have an aspect ratio between 30 to 100. To prepare a wire enamel coat having the intended physical properties, it is very important that the fine inorganic particles and the silicone resin in the wire enamel form a strong bond at their interface. For this purpose, it is preferred that the inorganic particles be surface-treated with a surface active agent such as an aliphatic acid (e.g., stearic acid or rhodinic acid) or a salt thereof, or a silane or titanium coupling agent or coating agent. Such surface treatment increases the miscibility of the fine inorganic particles with the silicone resin and permits more inorganic particles to be mixed with the silicone resin. This has an additional effect of improving the physical properties of the wire enamel coat.

The silicone resin is preferably mixed with 50 to 200 phr of the fine particles of inorganic tabular crystalline material. The symbol phr indicates how many parts by weight of the fine inorganic particles are blended with 100 parts by weight of the resin. As the temperature of the silicone resin matrix having the fine inorganic particles dispersed therein is increased, the bond between the organic groups and silicon atoms in the silicone resin breaks apart at a specific temperature to let the organic groups evaporate. The remaining active species in the backbone of the silicone resin are bound chemically with the activated portions of the fine inorganic particles to form an inorganic polymer having a three-dimensional network, namely, a ceramic. This is probably the mechanism by which the enamel coat made from a wire enamel comprising the silicone resin matrix having the fine particles of inorganic tabular crystalline material dispersed therein turns into a ceramic when it is exposed to hot atmospheres. If less than 50 phr of the fine inorganic particles is inocrporated in the silicone resin, the organic groups that have been bonded to silicon atoms in the silicone resin may evaporate at elevated temperatures, but since they have an insufficient amount of the fine inorganic particles which are bound with them chemically to form a three-dimensional network, the resulting ceramic is undesirably brittle. If more than 200 phr of the fine inorganic particles is used, the relative amount of the silicone resin matrix that also serves as a binder is decreased, the the resulting wire enamel coat, even before it is heated to form a ceramic, is porous and has little flexibility and low dielectric breakdown voltage. In addition, only a very brittle ceramic is formed from such a coating and its resistance to overload is not as high as is desired. So, if it is subjected to heat cycles, the coat easily cracks and comes off the conductor.

Wire enamel comprising the silicone resin having the fine particles of inorganic tabular crystalline material incorporated therein is applied to the conductor through a die. Usually application of wire enamels using a die can be carried out at a temperature of from 20° to 40° C. However, when wire enamels having a high viscosity are used and elongation of conductors is expected to occur the wire enamels can be heated to about 70° C. It is preferred to stir the wire enamel to prevent sedimentation of inorganic substances contained therein.

The configuration of the outlet of the die is not particularly limited and any shape of the outlet may be used unless it causes leakage of wire enamels resulting in the occurrence of grains. On the other hand, the configuration of the die cavity is very important in orientating the tabular crystals parallel to the conductor surface. When the wire enamel is in the form of a solution, the tabular crystals are randomly orientated. However, if the wire enamel is applied onto the conductor through a die having a cavity wherein an inverted cone frustum is smoothly connected to a cylinder in the direction in which the wire enamel is advanced, the tabular crystals in the frustoconical part of the cavity are subjected to forces that cause them to be gradually orientated parallel to the conductor surface. The shape of the die, and its positioning with respect to the cylinder and conductor surface, coupled with the laminar flow of the wire enamel in the cylindrical part of the cavity, provides continuous layers of tabular crystals orientated parallel to the conductor surface.

The cylindrical part of the die cavity is usually effective if it is at least 0.5 mm long. A suitable frustoconical part of the cavity has a certain minimum length and is gradually tapered. If a die having a very short or sharply tapered frustoconical cavity is used, it frequently occurs that the tabular crystals in the fine inorganic material are not orientated completely parallel to the conductor surface. It has been confirmed experimentally that the desired orientation of the tabular crystals can be achieved by using a die wherein the frustoconical part of the cavity has a side wall that forms an angle of not more than 45 degrees with respect to the center axis and that is at least 10 mm long. If the side wall of the frustoconical part has an angle greater than 45 degrees with respect to the center axis, the tabular crystals are subjected to a great force so fast that they obstruct each other and are not orientated completely parallel to the conductor surface before they pass through the cylindrical part of the cavity and baked. The same thing happens when the side wall of the frustoconical part is less than 10 mm long even if it forms an angle not greater than 45 degrees with respect to the center axis. The side wall of the frustoconical part need not be completely flat, and it may be gradually curved upward (to form a convex) or it may even be curved downward (to form a concave) slightly. The orientation of the tabular crystals in the wire enamel coat can be easily confirmed by observing transversal and longitudinal sections of the electric wire with a scanning electron microscope.

Coated wires can be baked at a temperature of from 350° to 450° C. and preferably 370° to 420° C. Baking speed is selected depending on the size of the conductor. For example, those having a conductor diameter of 0.7 mm can be baked at a speed of 10 to 35 m/min. The degree of baking depends on the temperature and speed of baking. The wire enamel coating may not be undercured so that the solvent used remains in an amount of 0.5% by weight or more nor overcured so that it remains in an amount of 0.005% by weight based on the weight of the baked coating.

Most of the fine particles of inorganic tabular crystalline material occur naturally. The purity of natural products differs greatly according to the place where they are produced, and some products contain much impurity in the form of, say, iron, calcium or aluminum. A baked coat prepared from a wire enamel comprising a silicone resin having incorporated therein fine particles of such natural impure tabular crystalline material has a somewhat lower dielectric breakdown voltage due to metal impurities before it is converted to a ceramic, and even if it is turned into a ceramic, cracks easily develop in the coat. The coat also has a somewhat lower resistance to overload, and when it is subjected to heat cycles, it easily comes off the conductor.

As is well known, synthetic mica is commercially available as artificial inorganic matter having tabular crystals. Since this synthetic mica is produced by artificially crystallizing selected pure materials, it always comprises high-purity homogeneous tabular crystals. An electric wire having a wire enamel coat prepared from wire enamel comprising such synthetic mica and silicone resin by being applied to the conductor through a die in such a manner that the tabular crystals are orientated parallel to the conductor surface apparently had better characteristics than a wire having an enamel coat using natural mica.

The present invention also provides an electric wire that is resistant to overload and which has a two-layered wire enamel coat. The present inventors have found that a wire enamel coat that is capable of withstanding very severe coiling conditions can be obtained by forming a protective polyimide topcoat on the wire enamel coat that has been described above and which can be converted to a ceramic. In this two-layer arrangement, the thickness of the topcoat is preferably not more than 40% of the total wire enamel coat. Examples of suitable polyimides which can be used as a topcoat include commonly used polyimide varnish such as Pyre-ML RC-5057 and RC-5097 from E. I. Du Pont de Nemours Co. The viscosity of the varnish need be adjusted depending on the size of the conductor; when the conductor is thin the varnish is diluted with a solvent to reduce its viscosity. As is well known, polyimide wire enamel coat is the most heat-resistant of the existing organic wire enamel coats and hence is most preferred for improving the resistance to overload of the undercoat. The polyimide coat also has high mechanical strength and an elongation of 100% or more. Therefore, by combining it with the undercoat, a wire enamel coat having much improved flexibility and sufficient strength to withstand coiling under severe conditions is produced. Since the resistance to overload is primarily achieved by the undercoat that becomes a ceramic at elevated temperatures, a topcoat thicker than 40% of the total wire enamel coat which means a correspondingly thin undercoat provides a wire enamel coat that is sufficiently strong to withstand coiling under severe conditions but which is low in resistance to overload.

The present invention is now described in greater detail by reference to the following examples and comparative examples which are given here for illustrative purposes only and are by no means intended to limit its scope. The characteristics of the enameled wires prepared in the examples and comparative examples were evaluated by the following tests.

Flexibility at 20% elongation: A wire sample that had been extended by 20% was subjected to a flexibility test (visual method) according to JIS C3003.

Bond strength: Evaluated by a bond strength test (rapid elongation method) according to JIS C3003.

Dielectric breakdown voltage: Evaluated by a dielectric breakdown test according to JIS C3003.

Coil resistance to burnout: A wire sample was wound around a cylindrical mandrel (core diameter: 40 mm, flange diameter: 70 mm, width: 20 mm) with 132 turns, and a d.c. voltage of 22 v was applied to the two terminals, and the time to burnout was measured.

Coil resistance to burnout (20% elongated wire): A wire sample with a previous stretch by 20% was subjected to the above test.

Resistance to heat cycles of ceramic coat: A wire sample was wound around a cylindrical mandrel (core diameter: 40 mm, flange diameter: 70 mm, width: 20 mm) with 30 turns. The mandrel was heated in an electric constant temperature bath at 500° C. for one hour until the wire enamel coat became a ceramic. The wire was then cooled slowly to 20° C. where it was held for 15 minutes. Subsequently, the wire was heated to 500° C. at a rate of about 20° C. per minute, and it was held at 500° C. for 15 minutes. The number of cooling and heating cycles required for the wire enamel coat to crack and come off the conductor was counted.

In Comparative Examples 1 to 3, wire enamel compositions having nontabular cyrstalline alumina powder, silica powder and magnesia powder were used, respectively. The flexibility at 20% elongation of the resulting wire enamel coats that had not been exposed to elevated temperature to become a ceramic was as low as 6d or 7d ("d" indicates the diameter of the mandrel around which the sample wire could be wound without cracking in the wire enamel coat), and the strength of the bond between the coat and the conductor was also poor. The coil resistance to burnout was as short as 3 or 4 hours, and the same characteristics at 20% elongation was 1.8 to 2.5 hours that was about 65% of the value achieved with the unstretched coil. The performance of the samples in the heat cycle test was very poor since the wire enamel coat cracked and came off the conductor after one or two heat cycles.

In Comparative Examples 4 to 10, enamel compositions having Indian natural white mica powder, U.S. talc powder and Canadian natural phlogopite were used, all of which comprised tabular crystals. These crystals formed continuous layers in which they were orientated parallel to the conductor surface although the degree of parallel orientation varied slightly from sample to sample. Therefore, the wire enamel coats had values of flexibility at 20% elongation of 1d to 3d even before they were heated to become a ceramic. The bond strength between the wire enamel coats and the conductor was obviously greater than that achieved in Comparative Examples 1 to 3. The coil resistance to burnout of the wire enamel coats before they were heated to form a ceramic was 4 to 11 hours, which was significantly longer than the values (3 to 4 hours) achieved in Comparative Examples 1 to 3. After elongation by 20%, surprisingly high values, 125 to 175% of the values obtained with the unstretched wire, were achieved. In the heat cycle test, the ceramic coats of Examples 4 to 10 withstood 4 to 14 cycles whereas the samples of Comparative Examples 1 to 3 withstood only 1 to 2 cycles. It was very obvious that the wire enamel coat of Comparative Examples 4 to 10 using tabular crystalline inorganic materials had significantly improved characteristics over the samples of Comparative Examples 1 to 3 using the nontabular crystalline particles of alumina, silica and magnesia. In Comparative Examples 4 and 5, natural white mica containing much impurity as iron and calcium was used, so the wire samples had dielectric breakdown voltages of 1.6 kv and 1.8 kv which were lower than the values of other samples.

In Examples 1 and 2, synthetic fluoro-phlogopite containing no impurity was used, so the wire samples of these examples had dielectric breakdown voltages of as high as 3 kv and 3.5 kv. The natural white mica powder used in Comparative Examples 4 and 5 had average aspect ratios that were outside the range defined in the present invention, so the tabular crystals were not orientated completely parallel to the conductor surface. On the other hand, the fluoro-phlogopite mica powder used in Examples 1 and 2 had average aspect ratios within the specified range, so the tabular crystals were orientated completely parallel to the conductor surface. As a result, the coil resistance to burnout of the wire enamel coats of Examples 1 and 2 was 20 and 24 hours, which was suprisingly about three times as long as the values (7 and 8 hours) achieved with the samples of Comparative Examples 4 and 5. The same result was obtained in the coil resistance to burnout test using 20% elongated wire; the samples of Examples 1 and 2 withstood the test for a period 3 to 4 times as long as the samples of Comparative Examples 4 and 5. In the heat cycle test, the samples of Comparative Examples 4 and 5 withstood 5 to 8 cycles, and 7 to 10 cycles, respectively, whereas the samples of Examples 1 and 2 withstood 13 to 16 cycles, and 20 to 24 cycles, respectively, which were about twice to three times as long as the periods withstood by the samples of Comparative Examples 4 and 5. This is because in the samples of Examples 1 and 2, the tabular crystals formed continuous layers wherein they were orientated completely parallel to the conductor surface.

In Comparative Examples 6 and 7, U.S. talc powder was used in amounts that were outside the range specified in the present invention, so the wire enamel coats could withstand the coil resistance to burnout test for 8 and 11 hours, respectively. They could also be turned into only brittle ceramic coats even if they were exposed to high temperatures, and they withstood only 4 to 7 cycles in the heat cycle test. But in Examples 3 to 5, synthetic potassium tetrasilicon mica was incorporated in silicone varnish in amounts within the range specified by the present invention, so complete ceramic coats were made from the wire enamel coats and they withstood the coil resistance to burnout test for 18 to 30 hours, which was nearly three times the values achieved by the samples of Comparative Examples 6 and 7. They also could withstand 12 to 25 cycles in the heat cycle test, a value almost three times the values achieved by the samples of Comparative Examples 6 and 7. Although the amounts of the talc used in Comparative Examples 6 and 7 were not within the range specified in the present invention, it has average aspect ratios within the range specified by the present invention, so the tabular crystals of talc were orientated parallel to the conductor surface, and the coil resistance to burnout using 20% elongated wire was improved over the values achieved using the unstretched wire. But much more improvement was achieved in the samples of Examples 3 to 5.

In Comparative Examples 8 and 9, a die whose cavity has a configuration that did not meet the requirements of the present invention was used, so the tabular crystals of phlogopite were not orientated completely parallel to the conductor surface. The wire enamel coats withstood only 8 and 7 hours in the coil resistance to burnout test, and the coil resistance to burnout characteristics using 20% elongated wire were not much improved over the values obtained using the unstretched wire. The wire enamel coats could withstand only 5 to 8 cycles in the heat cycle test. But the die used in Examples 6 to 9 had a cavity configuration that met the requirements of the present invention, so continuous layers of fluoro-phlogopite wherein the tabular crystals were orientated parallel to the conductor surface were produced. As a result, the wire enamel coats withstood the coil resistance to burnout test for 16 to 30 hours, twice to four times as long as the periods withstood by the samples of Comparative Examples 8 and 9. At the same time, the coil resistance to burnout using 20% elongated wire was much improved over the result using the unstretched wire. The wire enamel coats withstood 19 to 27 cycles in the heat cycle test, 3 to 4 times the length achieved by the samples of Comparative Examples 8 and 9.

In Comparative Example 10, the wire enamel coats were made of a polyimide topcoat and an undercoat, and the thickness of the polyimide coat was 60% of the total coat thickness although the upper limit specified by the present invention was 40%. The thick overcoat compensated for the low dielectric breakdown voltage of the undercoat and the overall wire enamel coat had a value of 3.5 kv, and its flexibility at 20% elongation was as good as 1D. But because of the thinness of the undercoat that was converted into a ceramic under elevated temperatures, the wire enamel coat could withstand only 4 hours in the coil resistance to burnout test. On the other hand, the wire enamel coats prepared in Examples 10 and 11 each had a polyimide topcoat that was less than 40% of the total wire enamel coat thickness, so the wire enamel coats had a flexibility at 20 elongation of 1d and their values of dielectric breakdown voltage were as high as 5 kv and 4.7 kv. Because the undercoat which was converted into a ceramic at elevated temperatures was not excessively thin, the overall wire enamel coats could withstand the coil resistance to burnout test for 17 and 23 hours, which was 4 to 6 times as long as the period withstood by the sample of Comparative Example 10. In Comparative Example 10 as well as Examples 10 and 11, the tabular crystals of phlogopite and potassium tetrasilicon mica formed continuous layers wherein they were orientated parallel to the conductor surface, so the coil resistance to burnout using 20% elongated wire was 170 to 187% as high as the values obtained with the unstretched wire. Furthermore, the wire enamel coats of Comparative Example 10 and Examples 10 and 11 withstood 12 to 22 cycles in the heat cycle test, quite an improvement over the samples of Comparative Examples 4 to 9 that withstood only 4 to 10 cycles.

As these data show, the enameled wires of the present invention have very good characteristics with respect to flexibility, strength of bond between the wire enamel coat and conductor, dielectric breakdown voltage and resistance to overload. As a particular advantage, their resistance to overload is increased after they are coiled under severe conditions involving stretching, compression, friction and twisting. A ceramic coat that is formed by exposing the wire enamel coat to elevated temperatures does not easily crack or come off the conductor even if it is subjected to heat cycles.

In the Examples and Comparative Examples, nickel-plated copper conductors with a diameter of 0.7 mm were used, but any conventional type of conductor can be used in the present invention. In the Comparative Examples, natural white mica, phlogopite and talc powders were used as fine particles of inorganic tabular crystalline material in contrast with synthetic fluoro-phlogopite and potassium tetrasilicon mica, but it should be understood that other natural inorganic tabular crystalline materials can be used if they become a ceramic at elevated temperatures in the presence of silicone resins or modified silicone resins, and illustrative examples include bentonite, montmorillonite, margarite, apophyllite, vermiculite, daphnite, vollastonite, kaolinite and steatite.

In the Examples and Comparative Examples the following silicone varnishes were used.

Silicone varnish KR-271 from Shinetsu Chemical Industries Co., Ltd.: This varnish is a grade H heat resistant insulating varnish which is suited for braking at high temperatures.

Silicone varnish KR-261 from Shinetsu Chemical Industries Co., Ltd.: This varnish is a grade H heat resistant insulating varnish which is suited for baking at high temperatures and can provide a flexible enamel coating.

Silicone varnish TSR-116 from Toshiba Silicone Co., Ltd.: This varnish is a grade H heat resistant insulating varnish which is suited for baking at high temperatures and can provide a flexible enamel coating that is cold resistant.

COMPARATIVE EXAMPLE 1

The following two components were mixed thoroughly under agitation to form a wire enamel composition.

| | parts by weight |
|---|---|
| Silicone varnish KR-271 from Shinetsu Chemical Industries Co., Ltd. (resin content: 50%) | 100 |
| Fine alumina powder (maximum average diameter: 70μ, average of average diameter: 30μ, surface-treated with silane coupling agent) | 65 |

The wire enamel was applied to a nickel-plated copper conductor (diameter: 0.7 mm) through a die in eight layers which were individually baked in an oven to form a wire enamel coat 28μ thick. The baking over was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 7d (no cracks) |
| Bond strength | poor |
| Dielectric breakdown voltage | 1.5 kv |
| Coil resistance to burnout | 4 hr |
| Coil resistance to burnout (20% elongated wire) | 2.5 hr |
| Resistance of ceramic coat to heat cycles | 1 or 2 cycles |

COMPARATIVE EXAMPLE 2

The following two components were mixed thoroughly under agitation to form a wire enamel composition.

| | parts by weight |
|---|---|
| Silicone varnish KR-261 from Shinetsu Chemical Industries Co., Ltd. (resin content: 50%) | 100 |
| Fine silica powder (maximum average diameter: 55μ, average of average diameter: 20μ, surface-treated with silane coupling agent) | 65 |

The wire enamel was applied to a nickel-plate copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting insulated electric wire had the following characteristics:

| | |
|---|---|
| Flexibility at 20% elongation | 7d (no cracks) |
| Bond strength | poor |
| Dielectric breakdown voltage | 1.8 kv |
| Coil resistance to burnout | 3 hr |
| Coil resistance to burnout (20% elongated wire) | 2 hr |
| Resistance of ceramic coat to heat cycles | 1 or 2 cycles |

COMPARATIVE EXAMPLE 3

The following two components were mixed thoroughly under agitation to form a wire enamel composition.

| | parts by weight |
|---|---|
| Silicone varnish TSR-116 from Toshiba Silicone Co., Ltd. (resin content: 50%) | 100 |
| Fine magnesia powder (maximum average diameter: 40μ, average of average diameter: 15μ, surface-treated with acidic magnesium phosphate) | 65 |

The wire enamel was applied to a nickel-plated copper conductor (diameter: 0.7 mm) through a die in six layers which were individually baked in an oven to form a wire enamel coat 23μ thick. Polyimide wire enamel (Pyre ML varnish from Du Pont, U.S.A.) was overcoated in two layers which were individually baked to form a topcoat 5μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 6d (no cracks) |
| Bond strength | poor |
| Dielectric breakdown voltage | 2 kv |
| Coil resistance to burnout | 3 hr |
| Coil resistance to burnout (20% elongated wire) | 1.8 hr |
| Resistance of ceramic coat to heat cycles | 1 or 2 cycles |

COMPARATIVE EXAMPLE 4

The following two components were mixed thoroughly under agitation to form a wire enamel composition.

| | parts by weight |
|---|---|
| Silicone varnish KR-271 from Shinetsu Chemical Industries Co., Ltd. (resin content: 50%) | 100 |
| Indian natural white mica powder (maximum average diameter: 75μ, average of average diameter: 48μ, average aspect ratio: 20, surface-treated with acidic magnesium phosphate) | 65 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 13 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 1.8 kv |
| Coil resistance to burnout | 7 hr |
| Coil resistance to burnout (20% elongated wire) | 10 hr |
| Resistance of ceramic coat to heat cycles | 5 to 8 cycles |

COMPARATIVE EXAMPLE 5

The following two components were mixed thoroughly under agitation to form a wire enamel composition.

| | parts by weight |
|---|---|
| Silicone varnish KR-271 from Shinetsu Chemical Industries Co., Ltd. (resin content: 50%) | 100 |
| Indian natural white mica powder (maximum average diameter: 30μ, average of average diameter: 12μ, average aspect ratio: 150, surface-treated with acidic magnesium phosphate) | 65 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 13 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 1.6 kv |
| Coil resistance to burnout | 8 hr |
| Coil resistance to burnout (20% elongated wire) | 10 hr |
| Resistance of ceramic coat to heat cycles | 7 to 10 cycles |

COMPARATIVE EXAMPLE 6

The following two components were mixed thoroughly under agitation to form a wire enamel composition.

| | parts by weight |
|---|---|
| Silicone varnish KR-261 from Shinetsu Chemical Industries Co., Ltd. (resin content: 50%) | 100 |
| U.S. talc powder (maximum average diameter: 44μ, average of average diameter: 10μ, average aspect ratio: 60, surface-treated with silane coupling agent) | 115 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 1.8 kv |
| Coil resistance to burnout | 8 hr |
| Coil resistance to burnout (20% elongated wire) | 11 hr |
| Resistance of ceramic coat to heat cycles | 4 to 7 cycles |

COMPARATIVE EXAMPLE 7

The following two components were mixed thoroughly under agitation to form a wire enamel composition.

| | parts by weight |
|---|---|
| Silicone varnish KR-261 from Shinetsu Chemical Industries Co., Ltd. (resin content: 50%) | 100 |
| U.S. talc powder (maximum average diameter: 44μ, average of average diameter: 10μ, average aspect ratio: 60, surface-treated with silane coupling agent) | 115 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 3d (no cracks) |
| Bond strength | good |
| Dielectric breakdown voltage | 1.3 kv |
| Coil resistance to burnout | 11 hr |
| Coil resistance to burnout (20% elongated wire) | 16 hr |
| Resistance of ceramic coat to heat cycles | 4 to 7 cycles |

COMPARATIVE EXAMPLE 8

The following two components were mixed thoroughly under agitation to form a wire enamel composition.

| | parts by weight |
|---|---|
| Silicone varnish TSR-116 from Toshiba Silicone Co., Ltd. (resin content: 50%) | 100 |
| Canadian natural phlogopite powder (maximum average diameter: 50μ, average of average diameter: 12μ, average aspect ratio: 68, surface-treated with titanium coupling agent) | 65 |

The wire enamel was applied to a nickel-plated copper conductor (diameter: 0.7 mm) through a die in eight layers which were individually baked in an oven to form a wire enamel coat 28μ thick. The baking oven was 5 m, its temperature was 430° C. and the baking speed was 14 m/min. The die cavity consisted of an inverted frustoconical part connected smoothly to a cylindrical part. The side wall of the frustoconical part was 20 mm long and formed an angle of 60° with the center axis. The cylindrical part was 5 mm long. The resulting enameled wire had the following characteristics:

| | |
|---|---|
| Flexibility at 20% elongation | 3d (no cracks) |
| Bond strength | poor |
| Dielectric breakdown voltage | 2 kv |
| Coil resistance to burnout | 8 hr |
| Coil resistance to burnout (20% elongated wire) | 10 hr |
| Resistance of ceramic coat to heat cycles | 5 to 8 cycles |

COMPARATIVE EXAMPLE 9

The following two components were mixed thoroughly under agitation to form a wire enamel composition.

| | parts by weight |
|---|---|
| Silicone varnish TSR-116 from Toshiba Silicone Co., Ltd. (resin content: 50%) | 100 |
| Canadian natural phlogopite powder (maximum average diameter: 50μ, average of average diameter: 12μ, average aspect ratio: 68, surface-treated with titanium coupling agent) | 65 |

The wire enamel was applied to a nickel-plated copper conductor (diameter: 0.7 mm) through a die in eight layers which were individually baked in an oven to form a wire enamel coat 28μ thick. The baking oven was 5 m, its temperature was 430° C. and the baking speed was 14 m/min. The die cavity consisted of an inverted frustoconical part connected smoothly to a cylindrical part. The side wall of the frustoconical part was 6 mm long and formed an angle of 20° with the center axis. The cylindrical part was 5 mm long. The resulting enameled wire had the following characteristics:

| | |
|---|---|
| Flexibility at 20% elongation | 3d (no cracks) |
| Bond strength | good |
| Dielectric breakdown voltage | 2.5 kv |
| Coil resistance to burnout | 7 hr |
| Coil resistance to burnout (20% elongated wire) | 9 hr |
| Resistance of ceramic coat to heat cycles | 5 to 8 cycles |

COMPARATIVE EXAMPLE 10

The following two components were mixed thoroughly under agitation to form a wire enamel composition.

-continued

| | parts by weight |
|---|---|
| Silicone varnish TSR-116 from Toshiba Silicone Co., Ltd. (resin content: 50%) | 100 |
| Canadian natural phlogopite powder (maximum average diameter: 50μ, average of average diameter: 12μ, average aspect ratio: 68, surface-treated with titanium coupling agent) | 65 |

The wire enamel was applied to a nickel-plated copper conductor (diameter: 0.7 mm) through a die in three layers which were individually baked in an oven to form a wire enamel coat 11μ thick. Polyimide wire enamel (Pyre ML varnish from Du Pont, U.S.A.) was overcoated in six layers which were individually baked to form a topcoat 17μ thick. The baking oven was 5 m long, its temperature was 430° C. and the baking speed was 13 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 1d (no cracks) |
| Bond strength | good |
| Dielectric breakdown voltage | 3.5 kv |
| Coil resistance to burnout | 4 hr |
| Coil resistance to burnout (20% elongated wire) | 7 hr |
| Resistance of ceramic coat to heat cycles | 12 to 14 cycles |

EXAMPLE 1

The following two components were mixed thoroughly under agitation to form a wire enamel composition.

| | parts by weight |
|---|---|
| Silicone varnish KR-271 from Shinetsu Chemical Industries Co., Ltd. (resin content: 50%) | 100 |
| Fluoro-phlogopite (maximum average diameter: 45μ, average of average diameter: 18μ, average aspect ratio: 95, surface-treated with potassium rhodinate) | 65 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |

-continued

| | |
|---|---|
| Dielectric breakdown voltage | 3 kv |
| Coil resistance to burnout | 20 hr |
| Coil resistance to burnout (20% elongated wire) | 33 hr |
| Resistance of ceramic coat to heat cycles | 13 to 16 cycles |

EXAMPLE 2

The following two components were mixed thoroughly under agitation to form a wire enamel composition.

| | parts by weight |
|---|---|
| Silicone varnish KR-271 from Shinetsu Chemical Industries Co., Ltd. (resin content: 50%) | 100 |
| Fluoro-phlogopite (maximum average diameter: 73μ, average of average diameter: 46μ, average aspect ratio: 40, surface-treated with potassium rhodinate) | 65 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 3.5 kv |
| Coil resistance to burnout | 24 hr |
| Coil resistance to burnout (20% elongated wire) | 45 hr |
| Resistance of ceramic coat to heat cycles | 20 to 24 cycles |

EXAMPLE 3

The following two components were mixed thoroughly under agitation to form a wire enamel composition.

| | parts by weight |
|---|---|
| Silicone varnish KR-261 from Shinetsu Chemical Industries Co., Ltd. (resin content: 50%) | 100 |
| Potassium tetrasilicon mica (maximum average diameter: 53μ, average of average diameter: 20μ, average aspect ratio: 48, surface-treated with potassium rhodinate) | 30 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 3 kv |
| Coil resistance to burnout | 18 hr |
| Coil resistance to burnout (20% elongated wire) | 30 hr |
| Resistance of ceramic coat to heat cycles | 12 to 15 cycles |

EXAMPLE 4

The following two components were mixed thoroughly under agitation to form a wire enamel composition.

| | parts by weight |
|---|---|
| Silicone varnish KR-261 from Shinetsu Chemical Industries Co., Ltd. (resin content: 50%) | 100 |
| Potassium tetrasilicon mica (maximum average diameter: 53μ, average of average diameter: 20μ, average aspect ratio: 48, surface-treated with potassium rhodinate) | 65 |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 3.8 kv |
| Coil resistance to burnout | 30 hr |
| Coil resistance to burnout (20% elongated wire) | 52 hr |
| Resistance of ceramic coat to heat cycles | 21 to 25 cycles |

EXAMPLE 5

The following two components were mixed thoroughly under agitation to form a wire enamel composition.

| | parts by weight |
|---|---|
| Silicone varnish KR-261 from Shinetsu Chemical Industries Co., Ltd. (resin content: 50%) | 100 |
| Potassium tetrasilicon mica (maximum average diameter: 53μ, average of average diameter: 20μ, | 95 |

-continued

| | parts by weight |
|---|---|
| average aspect ratio: 48, surface-treated with potassium rhodinate) | |

The wire enamel was applied to a nickel-plated copper conductor (diameter: 0.7 mm) through a die in eight layers which were individually baked in an oven to form a wire enamel coat 28μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 3.3 kv |
| Coil resistance to burnout | 27 hr |
| Coil resistance to burnout (20% elongated wire) | 40 hr |
| Resistance of ceramic coat to heat cycles | 20 to 23 cycles |

EXAMPLE 6

The following two components were mixed thoroughly under agitation to form a wire enamel composition.

| | parts by weight |
|---|---|
| Silicone varnish TSR-116 from Toshiba Silicone Co., Ltd. (resin content: 50%) | 100 |
| Fluoro-phlogopite (maximum average diameter: 40μ, average of average diameter: 13μ, average aspect ratio: 62, surface-treated with aluminum phosphite) | 65 |

The wire enamel was applied to a nickel-plated copper conductor (diameter: 0.7 mm) through a die in eight layers which were individually baked in an oven to form a wire enamel coat 28μ thick. The baking oven was 5 m, its temperature was 430° C. and the baking speed was 14 m/min. The die cavity consisted of an inverted frustoconical part connected smoothly to a cylindrical part. The side wall of the frustoconical part was 30 mm long and formed an angle of 40° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 3.6 kv |
| Coil resistance to burnout | 16 hr |
| Coil resistance to burnout (20% elongated wire) | 24 hr |
| Resistance of ceramic coat to heat cycles | 20 to 23 cycles |

EXAMPLE 7

The following two components were mixed thoroughly under agitation to form a wire enamel composition.

| | parts by weight |
|---|---|
| Silicone varnish TSR-116 from Toshiba Silicone Co., Ltd. (resin content: 50%) | 100 |
| Fluoro-phlogopite (maximum average diameter: 40μ, average of average diameter: 13μ, average aspect ratio: 62, surface-treated with aluminum phosphate) | 65 |

The wire enamel was applied to a nickel-plated copper conductor (diameter: 0.7 mm) through a die in eight layers which were individually baked in an oven to form a wire enamel coat 28μ thick. The baking oven was 5 m, its temperature was 430° C. and the baking speed was 14 m/min. The die cavity consisted of an inverted frustoconical part connected smoothly to a cylindrical part. The side wall of the frustoconical part was 30 mm long and formed an angle of 5° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 4 kv |
| Coil resistance to burnout | 30 hr |
| Coil resistance to burnout (20% elongated wire) | 48 hr |
| Resistance of ceramic coat to heat cycles | 23 to 27 cycles |

EXAMPLE 8

The following two components were mixed thoroughly under agitation to form a wire enamel composition.

| | parts by weight |
|---|---|
| Silicone varnish TSR-116 from Toshiba Silicone Co., Ltd. resin content: 50%) | 100 |
| Fluoro-phlogopic powder (maximum average diameter: 40μ, average of average diameter: 13μ, average aspect ratio: 62, surface treated with aluminum phosphate) | 65 |

The wire enamel was applied to a nickel-plated copper conductor (diameter: 0.7 mm) through a die in eight layers which were individually baked in an oven to form a wire enamel coat 28μ thick. The baking oven was 5 m, its temperature was 430° C. and the baking speed was 14 m/min. The die cavity consisted of an inverted frustoconical part connected smoothly to a cylindrical part. The side wall of the frustoconical part was 15 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectric breakdown voltage | 4.5 kv |
| Coil resistance to burnout | 21 hr |
| Coil resistance to burnout (20% elongated wire) | 32 hr |
| Resistance of ceramic coat to heat cycles | 14 to 22 cycles |

EXAMPLE 9

The wollowing two components were mixed thoroughly under agitation to form a wire enamel composition.

| | parts by weight |
|---|---|
| Silicone varnish TSR-116 from Toshiba Silicone Co., Ltd. resin content: 50%) | 100 |
| Fluoro-phlogopic powder (maximum average diameter: 40μ, average of average diameter: 13μ, average aspect ratio: 62, surface treated with aluminum phosphate) | 65 |

The wire enamel was applied to a nickel-plated copper conductor (diameter: 0.7 mm) through a die in eight layers which were individually baked in an oven to form a wire enamel coat 28μ thick. The baking oven was 5 m, its temperature was 430° C. and the baking speed was 14 m/min. The die cavity consisted of an inverted frustoconical part connected smoothly to a cylindrical part. The side wall of the frustoconical part was 40 mm long and formed an angle of 20° with the center axis. The cylindrical part was 5 mm long. The resulting enameled wire had the following characteristics:

| | |
|---|---|
| Flexibility at 20% elongation | 2d (no cracks) |
| Bond strength | good |
| Dielectic breakdown voltage | 3.5 kv |
| Coil resistance to burnout | 25 hr |
| Coil resistance to burnout (20% elongated wire) | 40 hr |
| Resistance of ceramic coat to heat cycles | 19 to 22 cycles |

EXAMPLE 10

The following two components were mixed thoroughly under agitation to form a wire enamel composition.

| | parts by weight |
|---|---|
| Silicone varnish TSR-116 from Toshiba Silicone Co., Ltd. (resin content: 50%) | 100 |
| Potassium tetrasilicon mica (maximum average diameter: 70μ, average of average diameter: 37μ, average aspect ratio: 74, surface-treated with potassium rhodinate) | 65 |

The wire enamel was applied to a nickel-plated copper conductor (diameter: 0.7 mm) through a die in five layers which were individually baked in an oven to form a wire enamel coat 18μ thick. Polyimide wire enamel (Pyre ML varnish from Du Pont, U.S.A.) was overcoated in four layers which were individually baked to form a topcoat 10μ thick. The baking oven was 5 m long, its temperature was 430° C. and the baking speed was 14 m/min.

The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 1d (no cracks) |
| Bond strength | good |
| Dielectric breakdown voltage | 5 kv |
| Coil resistance to burnout | 17 hr |
| Coil resistance to burnout (20% elongated wire) | 29 hr |
| Resistance of ceramic coat to heat cycles | 18 to 22 cycles |

EXAMPLE 11

The following two components were mixed thoroughly under agitation to form a wire enamel composition.

| | parts by weight |
|---|---|
| Silicone varnish TSR-116 from Toshiba Silicone Co., Ltd. (resin content: 50%) | 100 |
| Potassium tetrasilicon mica (maximum average diameter: 70μ, average of average diameter: 37μ, average aspect ratio: 74, surface-treated with potassium rhodinate) | 65 |

The wire enamel was applied to a nickel-plated copper conductor (diameter: 0.7 mm) through a die in seven layers which were individually baked in an oven to form a wire enamel coat 25μ thick. Polyimide wire enamel (Pyre ML varnish from Du Pont, U.S.A.) was overcoated in two layers which were individually baked to form a topcoat 3μ thick. The baking oven was 5 m long, its temperature was 430° C. and the baking speed was 14 m/min. The die cavity consisted of an inverted frustoconical part connected smoothly to a cylindrical part. The side wall of the frustoconical part was 30 mm long and formed an angle of 20° with the center axis. The cylindrical part was 5 mm long. The resulting enameled wire had the following characteristics:

| | |
|---|---|
| Flexibility at 20% elongation | 1d (no cracks) |
| Bond strength | good |
| Dielectric breakdown voltage | 4.7 kv |
| Coil resistance to burnout | 23 hr |
| Coil resistance to burnout (20% elongated wire) | 43 hr |
| Resistance of ceramic coat to heat cycles | 18 to 22 cycles |

While the invention has been described in detail and with reference to specific embodiments thereof, it will be apparent to one skilled in the art that various changes and modifications can be made therein without departing from the spirit and scope thereof.

What is claimed is:

1. A process for producing an enameled wire having resistance to overload, comprising the steps of:

providing an electric conductor wire;

providing a wire enamel coating material comprising a silicone resin having incorporated therein 50 to 200 parts by weight of particles of an inorganic tabular crystalline material per 100 parts by weight of the silicone resin, the particles having a maximum average particle size not greater than 80μ, an average not greater than 40μ and an average aspect ratio of between 30 and 100 and which react with the silicone resin at elevated temperatures to become a ceramic, the particles having been treated with an agent capable of increasing the miscibility of the particles with the silicone resin;

placing the enamel coating material in a die having a frustoconical shape;

applying the enamel coating material to the conductor wire to form a coating, wherein the coating formed by each cycle of application has a thickness of not more than 10μ, and wherein the tabular crystals in the coating are orientated parallel to the surface of the conductor wire; and baking the coating to harden the coating on the wire conductor, providing a hard outer coating.

2. A process as claimed in claim 1, wherein the agent is a coupling agent.

3. A process as claimed in claim 1, wherein the agent is a surface active agent.

4. A process as claimed in claim 1, wherein the agent is a coating agent.

5. A process as claimed in claim 1, further comprising the steps of:

applying a polyamide wire enamel to the hard outer coating, the thickness of the overcoat being not more than 40% of the total thickness of the coating, and baking the enameled wire with the overcoat thereon in order to harden the overcoat.

6. A process as claimed in claim 1, wherein the die having a frustoconical shape is smoothly connected to a cylindrical component, such that side walls of the frustoconical die are not less than 10 m long and form an angle of not greater than 45° with the center axis.

7. A process as claimed in claim 1, wherein the steps of applying the enameled coating material and baking the coating to harden the coating are repeatedly performed a plurality of times in order to form a plurality of enameled coatings on the conductor wire.

8. A process as claimed in claim 1, wherein the coating formed has a thickness of not more than 10μ.

9. A process as claimed in claim 3, wherein the surface active agent is an agent selected from the group consisting of stearic acid or rhodinic acid or a salt thereof.

10. A process as claimed in claim 2, wherein the coupling agent is selected from the group of agents consisting of silane or titanium coupling agents.

11. A process as claimed in claim 1, wherein the inorganic tabular crystalline material is a mica produced by artificially crystallizing pure materials.

12. An enameled wire having resistance to overload which comprises an electric conductor having a baked product of a wire enamel coat, said wire enamel coat comprising a silicone resin having incorporated therein 50 to 200 phr of particles of an inorganic tabular crystalline material that have a maximum average particle size not greater than 80μ, an average not greater than 40μ and an average aspect ratio between 30 and 100 and which can react with the silicone resin at elevated temperatures to become a ceramic and which have been surface-treated with a coupling agent, a surface active agent or a coating agent, the tabular crystals in the wire enamel coat being orientated parallel to the surface of the conductor.

13. An enameled wire according to claim 1, wherein said wire enamel coat has an overcoat made by applying and baking polyimide wire enamel, the thickness of the overcoat being not more than 40% of the total thickness of wire enamel coat.

* * * * *

UNITED STATES PATENT AND TRADEMARK OFFICE
CERTIFICATE OF CORRECTION

PATENT NO. : 4,476,192

DATED : October 9, 1984

INVENTOR(S) : Takeshi IMAI et al

It is certified that error appears in the above-identified patent and that said Letters Patent is hereby corrected as shown below:

On the title page, assingee should read:

--[73] Assignees: Sumitomo Electric Industries, Ltd.,
Osaka, Japan, and
Nippondenso Co., Ltd.,
Aichi, Japan --.

Signed and Sealed this

*Seventh* Day of *May 1985*

[SEAL]

*Attest:*

DONALD J. QUIGG

*Attesting Officer* *Acting Commissioner of Patents and Trademarks*